United States Patent Office
3,103,821
Patented Sept. 17, 1963

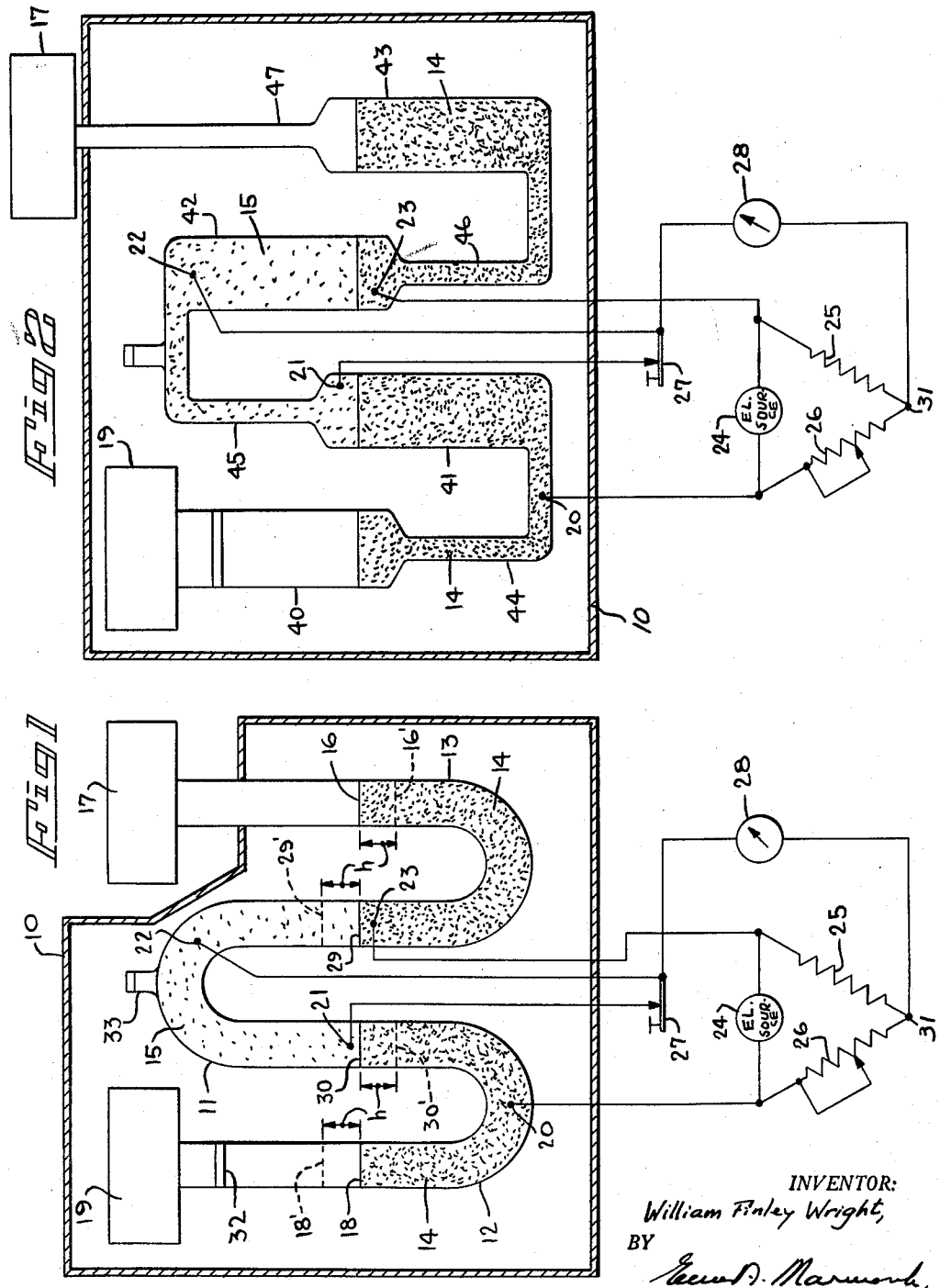

3,103,821
APPARATUS FOR MEASURING VARIABLE PRESSURE USING CONDUCTIVE FLUID
William Finley Wright, 2010 Front St., Vestal, N.Y.
Filed Aug. 4, 1959, Ser. No. 831,531
10 Claims. (Cl. 73—398)

The invention relates to measuring instruments, and relates more particularly to instruments for measuring various data such as pressure differences, or linear displacements, or the like, by electrically measuring the position between two electrodes.

It is accordingly among the principal objects of the invention to provide a reliable and accurate measuring instrument of the type referred to.

It is another object of the invention to provide such a measuring instrument which is independent of outside disturbances.

It is still another object of the invention to provide such a measuring instrument which is easy to manufacture and simple to use.

The foregoing and other objects of the invention will be best understood from the following description of exemplifications.

At least one of the electrodes is movable, and may either be solid or liquid or gas.

It is pointed out, however, that it is not intended to limit the invention to the specific exemplifications given below which are illustrative only and not intended for limitation save as restricted by the claims hereof.

The manometer exemplification according to the present invention may take the form of the type known as a U-tube manometer. The difference of pressures applied to two columns of a liquid, for instance mercury, in a U-shaped tube, is indicated by the difference in height of the two columns. The surface of one column is exposed to one pressure and the surface of the other column to another pressure; if this second pressure is a comparatively high vacuum, absolute pressure readings are obtained.

In conventional systems this difference in height may be optically determined, for instance by a cathetometer. Many errors can arise however in either the optical or the mechanical section of the system or due to temperature variations.

A further system has been developed in the past in which two fine wires are inserted in each mercury column. The resistance between the two wire terminals consists of the resistance of the two free wire sections above the mercury levels, the mercury acting as a two-wiper short-circuit, which remains constant. The resistance of each individual wire changes and can be used as a measurement of the pressure differential.

It is a disadvantage of that prior system, however, that the resistance of the two wires does not vary linearly with their length and that, consequently, the resistance variation is not strictly proportional to the pressure variation.

It is accordingly a further object of the invention to provide a manometer which supplies an electric quantity as a measure of the pressure.

It is still another object of the invention to provide a manometer which supplies an electric impedance variation which is proportional to the pressure variation.

The instant invention offers the advantage that in such a manometer no moving mechanical parts are used. The instant system admits of complete enclosure, facilitating more accurate temperature control of the various parts, resulting in greatly improved accuracy of measurement.

In accordance with the example of the instant invention, a central inverted U-shaped tube is connected with each of its downwardly extending arms to an upwardly extending arm of two upright U-shaped tubes, respectively. The two upright U-shaped tubes are filled with a heavy liquid which is also a good conductor of electricity, such as mercury, while the inverted U-shaped tube is filled with a liquid which is a substantially less good conductor, such as a salt solution, and which has a lower density and is immiscible with the mercury. The free liquid levels of the two upright tubes are exposed, respectively, to a comparison or reference pressure and to the unknown pressure. The variation in the impedance of each liquid column between certain points is proportional to the difference in pressures and it can be measured in any suitable electric circuit.

For instance, and merely by way of example, a bridge circuit may be used and the output of the bridge may be used to control the unknown pressure by a servo-system zero-positioning the bridge output. Alternatively, the bridge output may be indicated by an instrument or continuously recorded. Various other uses of a connected bridge or other impedance measuring circuit are possible with the measuring instrument according to the instant invention.

Further objects and advantages will be apparent from the following specification wherein, by way of exemplification, several embodiments of the invention are described in conjunction with the drawings, in which:

FIG. 1 is a schematic vertical sectional view of a measuring instrument in form of a manometer according to an embodiment of the invention with an associated electrical circuit diagram; and FIG. 2 is a sectional view, similar to FIG. 1, but embodying a modified measuring instrument of the manometer type.

The invention broadly provides for two movable electrodes and a fixed terminal in an electric circuit, with these electrodes fed from a source of electric power, and a conducting liquid establishes a linear voltage gradient between the said two electrodes. The two electrodes and the conducting liquid are movable relative to the terminal, and the electric circuit measures the position of the terminal relative to the gradient.

Referring now to FIG. 1, a thermostatically controlled container 10 is provided to exclude any error caused by changes of the specific physical or electrical parameters of the liquids due to temperature variations.

An inverted U-shaped tube 11 and two upright U-shaped tubes 12 and 13 are located within the container 10. The downwardly extending arms of the inverted U-shaped tube 11 form a continuation of one upstanding arm, of each of the upright tubes 12 and 13, respectively.

The upright tubes 12 and 13 are filled with a liquid 14 having a very high electrical conductivity, such as, for instance, mercury, and the inverted tube 11 is filled with a liquid 15 having a substantially smaller electrical conductivity, such as a salt solution. The mercury forms a non-solid movable electrode.

The numerals 32 designate a sealing means, such as a stop cock or a mercury seal. A stop cock 33 is provided at the uppermost area of the inverted U-shaped tube 11 to facilitate loading and adjusting of the manometer.

The free liquid level 16 of the liquid 14 in the upright U-shaped tube 13 is exposed to the pressure from the unknown pressure source in the container 17, while the free liquid level 18 of the liquid 14 in the upright U-shaped tube 12 is exposed to the pressure of a known pressure source of the container 19. This pressure source of the container 19 may be a comparatively high vacuum, in order to measure absolute pressures. Alternatively, this pressure source may be open to the atmosphere as a basis for comparison or to any other relatively constant pressure source.

Four electric terminals 20, 21, 22 and 23 are in the liquids. The terminal 20 is in contact with the liquid 14 in the upright U-shaped tube 12 at a point that will not be reached by the liquid 15 under any expected pressure condition. Both terminals 21 and 22 are in contact with the liquid 15 in the inverted U-shaped tube 11, at points that will not be reached by the liquid 14 under any expected pressure condition. The terminals 21 and 22 are spaced apart from each other within the liquid 15. The liquid 14 in the tube 12 will never reach the terminal 21, and the liquid 14 in the tube 13 will never reach the terminal 22. The terminal 23 makes contact with the liquid 14 in the tube 13 preferably close to the level at which the liquid 14 meets the liquid 15. The liquid levels are shown for the condition of a zero pressure difference in the pressure sources in the containers 17 and 19, so that the terminal 23 will remain in contact with the liquid 14 at all the expected pressure conditions.

An electric source 24 is located between the bridge terminals 20 and 23. The electric source 24 may be a source of direct current or of alternating current, the latter being preferred. A potential divider represented by a fixed ratio arm 25 and a variable ratio arm forms two legs of the bridge. Though the arms 25 and 26 are shown as resistances, they may instead be any other type of impedance, such as an inductive ratio transformer, or a capacitive voltage divider, or the like. The other two legs of the bridge are represented by the impedance of the liquid 15 between the terminals 20 and 21 and between the terminals 22 and 23, assuming that the terminals 21 and 22 are shorted. A normally closed switch or contact 27 extends between the terminals 21 and 22. A null sensing device or null detector or null indicator 28 located between the terminals 31 and 21—22 completes the bridge circuit. The levels 29 and 30 of the liquid 14 constitute the movable electrodes of the measuring instrument. Since the contact 27 must be closed during a measurement, the potentials of the terminals 21 and 22 are equal.

In operation of this exemplification, the pressure in the container 17 is assumed to be equal to or greater than the pressure in the container 19, for example the pressure in the container 17 may be assumed to rise so that both liquid columns 14 and the liquid column 15 are shifted by a distance "$h$" indicative of the change in pressure. Thus, the liquid levels 16, 29, 30 and 18 will move to the positions indicated by 16', 29', 30' and 18', respectively; the liquid levels 16, 29, 30 and 18 correspond to equal pressures in the containers 17 and 19. Since all tubes are assumed to be of the same diameter, neglecting the insignificant difference in compressibility of the two liquids all heights "$h$" are equal and, if special precautions are taken such as temperature control by the thermostatically controlled container 10, the height two times "$h$" is an accurate indication of the difference in pressure in the containers 17 and 19.

Due to the shifting of the liquid levels 29 and 30 to 29' and 30', respectively, the impedance between the terminals 20, 21—22 has increased, assuming the liquid 14 to be mercury and the liquid 15, for instance a salt solution, to have a substantially lower electric conductivity. Similarly, the impedance between the terminals 23 and 21—22 has decreased. These changes in impedance unbalance the ratio bridge circuit and the null indicator 28 will show a deviation from zero.

If it is intended to measure the pressure rise, the ratio arm 26 is adjusted until the bridge is again in balance, indicated by the zero reading on the null indicator 28. The ratio arm 26 may be directly calibrated in pressure units.

Alternatively, the null indicator 28 may be a servomechanism which adjusts the pressure in the container 17, so that the pressure is maintained constant at a desired value as set by the ratio arm 26.

In another application, the ratio arms 25 and 26 are replaced by a recording potentiometer. This recording potentiometer may be calibrated in pressure units and continuously record the pressure difference prevailing in the containers 17 and 19.

Obviously, the bridge circuit, although convenient, is not essential for the use of the manometer according to the present invention. The variation in impedance between either terminals 20 and 21 or terminals 22 and 23 can be used alone or in conjunction to measure, control or record a pressure by any suitable electric circuit.

Since the impedance of the conductance cell, namely the arms of the bridge between the terminals 20 and 21 and between the terminals 22 and 23 is temperature dependent, the manometer is preferably placed in the thermostatically controlled container 10.

The temperature control may be readily checked by opening the switch 27 and measuring the impedance between its opened terminals since the impedance at a specified temperature is known.

In the embodiment of the manometer shown in FIG. 2, the tubes 40, 41, 42 and 43 are precision bore tubes connected by tubes 44, 45, 46 and 47 which are not precision tubes and may be of a different diameter.

It will be apparent that a change in the tube cross-sections through which the liquid level travels will result in a corresponding change in the height "$h$" which is no longer proportional to the pressure variation. Therefore, precision bore tubes are present wherever a shift of the liquid level occurs so that the pertinent cross-sections are all equal, considerably increasing the accuracy of the pressure indication. Obviously the cross-sections need not be equal as long as their relationships are known.

Through the liquids 14 have been described as being the better conductors, they may instead be selected as the inferior conductors and the liquid 15 as the better conductor. This reversal may be advantageous for the measurement of low pressures, such as encountered at high altitudes. The liquid of higher density was given as mercury. The liquid of higher density, however, may instead have a density lower than that of mercury, thereby greatly increasing the measuring sensitivity though correspondingly decreasing the pressure range for the same physical dimensions used.

Reverting to the instrument of the type shown in FIGS. 1 and 2, the tubes may be so dimensioned that one liquid is disposed in a large diameter portion of the tube and the other liquid is disposed in a small diameter portion of the tube. This affords a change of the sensitivity of measurement; for instance, if the tubes 40 and 43 (FIG. 2) were to have twice the cross-sectional areas of the tubes 41 and 42, the displacement of the liquid interfaces in the tubes 41 and 42 would be double that of the tubes 40 and 43 for a given pressure difference in the containers 17 and 19; this would double the sensitivity of measuring.

The foregoing exemplification indicates the measuring of differences in pressure by means of a manometer type of the measuring instrument. The instrument according to the invention, however, may instead be used to measure linear distances, or linear movements. The term "linear" indicates that measurements of straight distances are made, but includes that the linear distance measured may itself be the product of non-linear distances or measurements, and the instrument may be calibrated, if needed, to give directly a reading of the original distances covered, an integer or other derivative of which is linearly measured by the instrument.

I wish it to be understood that I do not desire to be limited to the exact details of construction shown and described merely by way of exemplification, for obvious

Having thus described the invention, what I claim as new and desire to be secured by Letters Patent, is as follows:

1. In an apparatus for use in connection with an electric source, for measuring, recording or controlling a variable pressure in relation to a reference pressure, the combination of a central inverted U-shaped tube, a pair of upright U-shaped tubes, one arm of each of said upright U-shaped tubes communicating with one arm, respectively, of said inverted U-shaped tube, a first liquid having a high electric conductivity disposed in said upright U-shaped tubes, a second liquid disposed in said inverted U-shaped tube abutting the first liquid in both said upright U-shaped tubes at two common liquid levels, said second liquid having an electric conductivity which is substantially lower than the electric conductivity of said first liquid, the free surface of said first liquid in one of said upright U-shaped tubes being exposed to the variable pressure, the free surface of said first liquid in the other of said upright U-shaped tubes being exposed to said reference pressure, whereby a change in the variable pressure will shift all three liquids columns and thus the two common liquid levels; a first electric terminal in contact with said first liquid in one of said upright U-shaped tubes, a second electric terminal in contact with said first liquid in the other of said upright U-shaped tubes, said two terminals being connected to said electric source, and a third electric terminal in contact with said second liquid in said inverted U-shaped tube, each electric terminal contacting its one liquid column at all pressure conditions, said third electric terminal having an impedance ratio responsive electric circuit connected thereto and to said first and said second electric terminals.

2. In an apparatus, as claimed in claim 1, one arm of each of said upright tubes forming an aligned extension of one arm, respectively, of said inverted U-shaped tube.

3. In an apparatus, as claimed in claim 1, all three of said U-shaped tubes having the same circular cross-section throughout their extent.

4. In an apparatus, as claimed in claim 1, together with, a fourth electric terminal in contact with said second liquid at all pressure conditions, said fourth electric terminal being spaced from said third electric terminal and shunted therewith to short a surplus part of the second liquid independent of any pressure change.

5. In an apparatus, as claimed in claim 1, together with, means operable for maintaining the temperature of said liquids at a predetermined value.

6. In an apparatus, as claimed in claim 1, the reference pressure being a high vacuum.

7. In an apparatus, as claimed in claim 1, the two tube sections accommodating the extent of travel of the two common liquid levels between said first and said second liquid, and the two tube sections accommodating the extent of travel of the two free surfaces of said first liquid, being precision tube sections.

8. In an apparatus, as claimed in claim 7, the diameter of the precision tube sections being substantially different from the diameter of the other tube sections.

9. In an apparatus for use in connection with an electric source, for measuring, recording or controlling a variable pressure in relation to a reference pressure, the combination of at least one U-shaped tube, a first liquid having a high electric conductivity disposed in said U-shaped tube, a second liquid disposed in said U-shaped tube abutting the first liquid at two common liquid levels, said second liquid having an electric conductivity which is substantially lower than the electric conductivity of said first liquid, the free surface of one portion of said first liquid being exposed to the variable pressure, the free surface of the other portion of said first liquid being exposed to said reference pressure, whereby a change in the variable pressure will shift all three liquid bodies and thus the two common liquid levels; first and second electric terminals in contact each with one of said two portions of said first liquid, said two terminals being connected to said electric source, and a third electric terminal in contact with said second liquid, each electric terminal being in contact with its one liquid body at all pressure conditions, said third electric terminal having an impedance ratio responsive electric circuit connected thereto and to said first and second electric terminals.

10. In an apparatus for use in connection with an electric source, for measuring, recording or controlling a variable pressure in relation to a reference pressure, the combination of at least one U-shaped tube, a first liquid having a pre-determined electric conductivity disposed in said U-shaped tube, a second liquid disposed in said U-shaped tube abutting the first liquid at two common liquid levels, said second liquid having an electric conductivity which is different from the electric conductivity of said first liquid, the free surface of one portion of said first liquid being exposed to the variable pressure, the free surface of the other portion of said first liquid being exposed to said reference pressure, whereby a change in the variable pressure will shift all three liquid bodies and thus the two common liquid levels; first and second electric terminals in contact each with one of said two portions of said first liquid, said two terminals being connected to said electric source, and a third electric terminal in contact with said second liquid, each electric terminal being in contact with its one liquid body at all pressure conditions, said third electric terminal having an impedance ratio responsive electric circuit connected thereto and to said first and second electric terminals.

References Cited in the file of this patent

UNITED STATES PATENTS

| | | |
|---|---|---|
| 1,522,158 | Van Deventer | Jan. 6, 1925 |
| 1,727,254 | Shotter | Sept. 3, 1929 |
| 2,279,815 | Dressel | Apr. 14, 1942 |
| 2,973,646 | Campbell et al. | Mar. 7, 1961 |